United States Patent [19]

Fedrick

[11] Patent Number: 4,700,751
[45] Date of Patent: Oct. 20, 1987

[54] INSULATED PIPE APPARATUS

[76] Inventor: Ronald M. Fedrick, 3600 Fedrick Ranch Rd., Petaluma, Calif. 94952

[21] Appl. No.: 891,546

[22] Filed: Jul. 29, 1986

Related U.S. Application Data

[63] Continuation-in-part of Ser. No. 667,226, Nov. 1, 1984.

[51] Int. Cl.[4] .............................................. F16L 9/14
[52] U.S. Cl. .................................... 138/149; 138/104; 138/109; 138/114
[58] Field of Search ...................... 138/111, 96 R, 110, 138/109, 113, 114, 137, 148, 149, 172, 173, 174, 104, 103

[56] References Cited

U.S. PATENT DOCUMENTS

| | | |
|---|---|---|
| 2,805,972 | 9/1957 | Cross, Jr. et al. |
| 3,299,417 | 1/1967 | Sibthorpe ........................ 138/148 X |
| 3,345,245 | 10/1967 | Hanusa . |
| 3,934,618 | 1/1976 | Henderson ......................... 138/114 |
| 3,972,223 | 8/1976 | Torghele ......................... 138/104 X |
| 4,273,161 | 6/1981 | McLaughlin ....................... 138/149 |

Primary Examiner—James E. Bryant, III
Attorney, Agent, or Firm—Fitch, Even, Tabin & Flannery

[57] ABSTRACT

An insulated pipe apparatus comprises an inner conduit for carrying fluids, an insulated material surrounding the conduit which extends along substantially the entire length of the inner conduit, a sheet of corrugated material surrounding the insulating material so as to provide a plurality of substantially constant cross-section elongated voids along the length of the insulation, a rigid outer casing surrounding the corrugated sheet, and an end seal covering the end cross-section of the pipe apparatus except for the inner conduit and providing a means to interconnect the elongated voids and to connect them with external equipment. Slots cut into an insulating material may be substituted for the corrugated sheet to provide a plurality of substantially constant cross-section elongated voids. A gel coat may be added to the exterior surface of the outer casing to provide further protection from the environment for the pipe apparatus.

8 Claims, 7 Drawing Figures

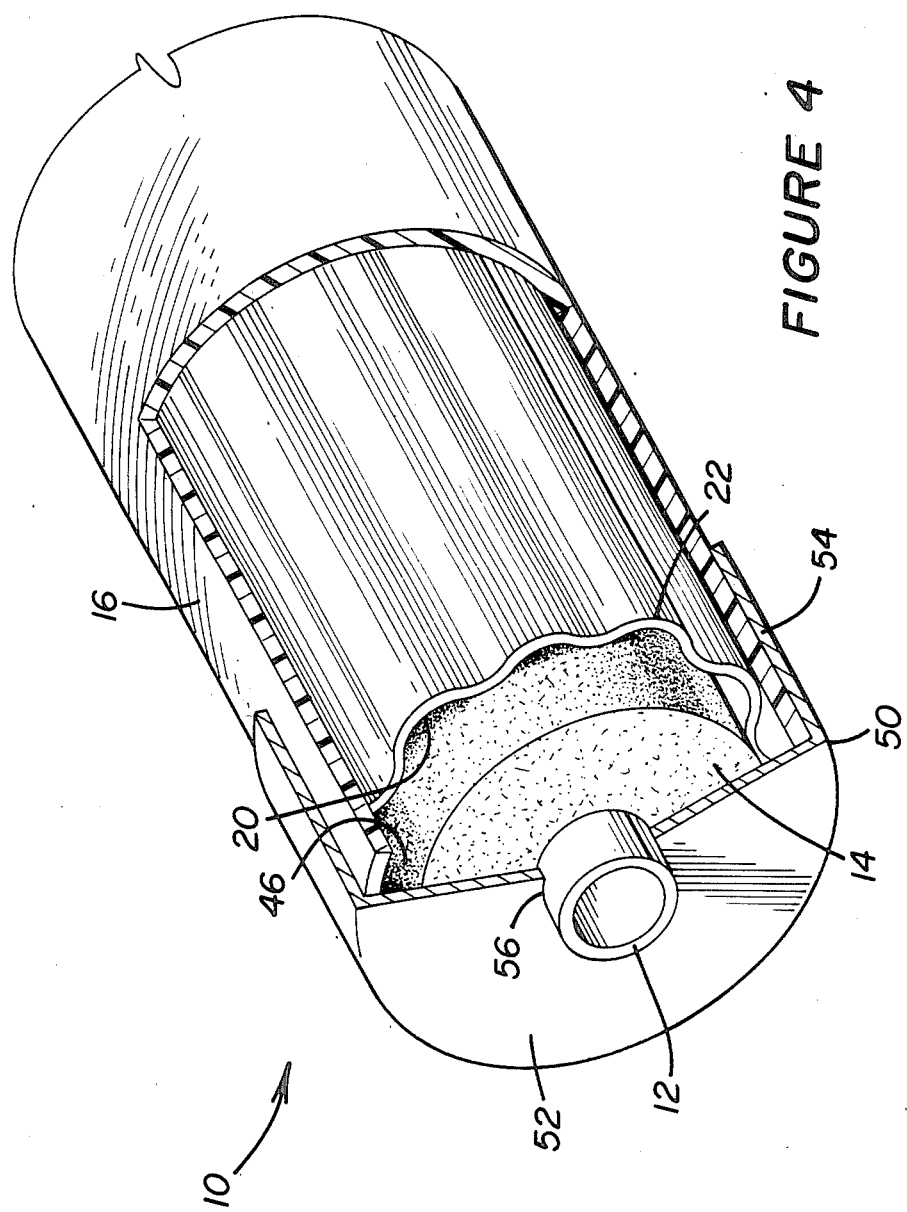

INSULATED PIPE APPARATUS

This application is a continuation-in-part of U.S. patent application Ser. No. 667,226, filed Nov. 1, 1984.

FIELD OF INVENTION

This invention relates to an insulated pipe apparatus adapted for use as a conduit in a high or low temperature fluid distribution system, and more particularly to an insulated pipe apparatus that is corrosion resistant and whose structure enables venting, draining, drying, and air testing of said insulated pipe apparatus.

BACKGROUND OF INVENTION

Insulated pipe structures are commonly used in heat distribution systems, where hot fluid or steam is distributed to a desired location, or in cryogenic applications. These systems can be used in residential or industrial applications such as for heating buildings or maintaining the temperature of a particular system. Such distribution systems are often installed underground and include a steel inner fluid carrying conduit surrounded by an insulating sleeve or jacket. The difficulty with this is that in most underground locations, water or dampness of some kind is present, which can damage the pipe apparatus over time. The water corrodes the steel fluid conduit and destroys the insulation's effectiveness in the system.

In one prior art pipe apparatus described in U.S. Pat. No. 3,677,303, an insulation sleeve surrounds an inner conduit which carries the heated fluid. The insulating sleeve and inner conduit are supported within a rigid, preformed casing by spacers which are located at intervals along the length of the sleeve, e.g. every nine feet, and which surround the sleeve circumferentially to support the insulation coaxially within the casing. The casing is formed from a pair of coaxially radially spaced plastic tubes. The spacers may include corrugated strips or be formed by rings which include holes in their surfaces. The voids between the corrugations allow air passage between unsupported sections of the insulation sleeve.

As seen in FIG. 5 of the above described patent, air spaces 83 formed by the corrugated support members 80 allow air to communicate between adjacent voids 82, forming a substantially continuous insulating air cavity throughout the length of the pipe. However, the voids created by the supporting members 80 are not of a continuous shape or constant cross-section along the length of the pipe between the insulated pipe and the outer casing, which is desirable not only for more complete venting, draining and drying, but also for air testing for structural and watertight integrity and detection of maintenance requirements.

Most prior art devices use steel conduit as a rigid outer casing, for purposes of enhanced strength. However, such devices do not provide protection from the corrosion of the casing and thus they allow the ingress of moisture through the exterior of the pipe apparatus to the insulation, destroying its effectiveness. Moisture may also come in contact with the inner fluid carrying conduit. If the inner conduit also corrodes in the presence of water, over time this conduit will be destroyed.

An object of the present invention is to provide an improved insulated pipe apparatus.

Another object of this invention is to provide an insulated pipe apparatus in which the possibility of moisture ingress is very low, thereby reducing the possibility of corrosion of an inner conduit.

Another object of this invention is to provide an insulated pipe apparatus with enhanced insulative properties and structural rigidity while providing access to its interior for facilitating venting, drying, and draining the insulating material and air testing for structural integrity and for detection of defects.

A further object of this invention is to provide means for sealing the ends of insulated pipe apparatus while providing for interconnection of a plurality of elongated voids which can be connected to external equipment.

Another object is to provide insulated pipe apparatus having improved provision for dissipation of heat from the inner conduit.

BRIEF DESCRIPTION OF THE DRAWINGS

These and other objects and advantages of the present invention will become more apparent upon reference to the detailed description of the preferred embodiment and to the accompanying drawings wherein:

FIG. 4 is a view of the insulated pipe apparatus showing the articulation of a rigid outer casing, a corrugated material, an insulating material, the inner conduit, and an end seal, as well as the physical interconnection of elongated voids formed by the corrugated material;

SUMMARY OF THE INVENTION

Figure 1:
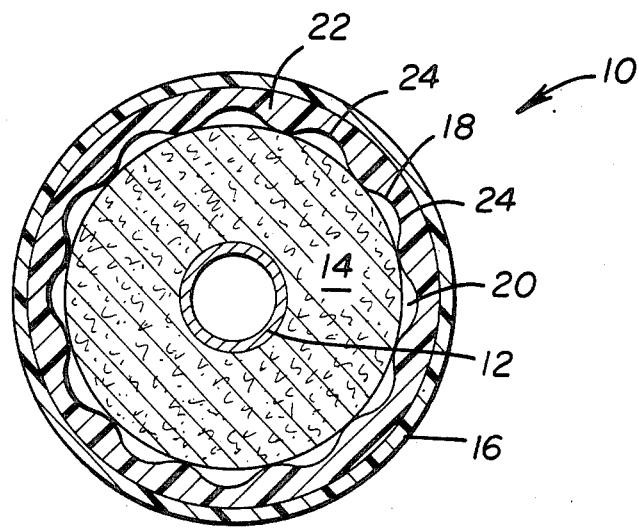
FIG. 1 is a cross-sectioned view of one embodiment of an insulated pipe apparatus in accordance with this invention.

The present invention is an insulated pipe apparatus which includes an inner conduit for carrying fluids. Insulating material in the form of a sleeve surrounds and extends substantially the length of the conduit. A plurality of elongated voids are defined around the insulating material. A fiberglass reinforced rigid outer casing surrounds the elongated voids. The elongated voids are continuous and of constant cross section and means are provided for sealing the ends of the pipe apparatus. Means are also provided for interconnecting the elongated voids, for connecting them to external equipment, and for dissipating heat from the inner conduit to protect the rigid outer casing from thermal damage.

The preferred embodiment of this invention includes insulating material in a continuous, seamless sleeve surrounding and being coextensive with the inner conduit.

The present invention also preferably includes a sheet of corrugated material between the insulating material and the rigid outer casing. The corrugated material thus defines the plurality of elongated voids.

Preferably, the rigid outer casing comprises a filament wound fiberglass roving bound by a resinous compound. The roving is spirally wound to form the casing during its manufacture.

The preferred embodiment of this invention also includes a seal in the form of a cap comprising a disk and a cylindrical sleeve. The disk covers the entire end cross-section of the pipe apparatus except for the inner conduit and the cylindrical sleeve extends along and is sealed to the outer surface of the rigid outer casing.

The end seal also preferably enables interconnection of the elongated voids by defining a continuous annular void between the insulating material and the outer casing when the corrugated material is recessed from the inner face of the end seal. Moreover, the end seal preferably includes ports facilitating connection between the annular void and equipment external to the pipe apparatus.

Another preferred embodiment of the pipe apparatus according to the present invention includes a continuous sleeve of insulating material having a plurality of slots which are cut into its outer surface. In combination with the outer casing, these slots define a plurality of constant cross-section elongated voids along substantially the entire length of the pipe apparatus.

This invention has the advantage of providing an insulated pipe apparatus whose structural rigidity resists mechanical stresses and whose materials and configurations of its elements prevent the ingress of moisture, mechanical damage and corrosion. Moreover, the interconnection of its elongated voids and their connection to external equipment enable the pipe apparatus to be vented, drained and dried, as well as air tested for structural and watertight integrity. The end seals of this invention dissipate heat from the inner conduit to protect the rigid outer casing from thermal damage which would compromise the structural rigidity, insulative capacity and waterproof properties of the entire apparatus.

DETAILED DESCRIPTION OF THE PREFERRED EMBODIMENT

Figure 3:
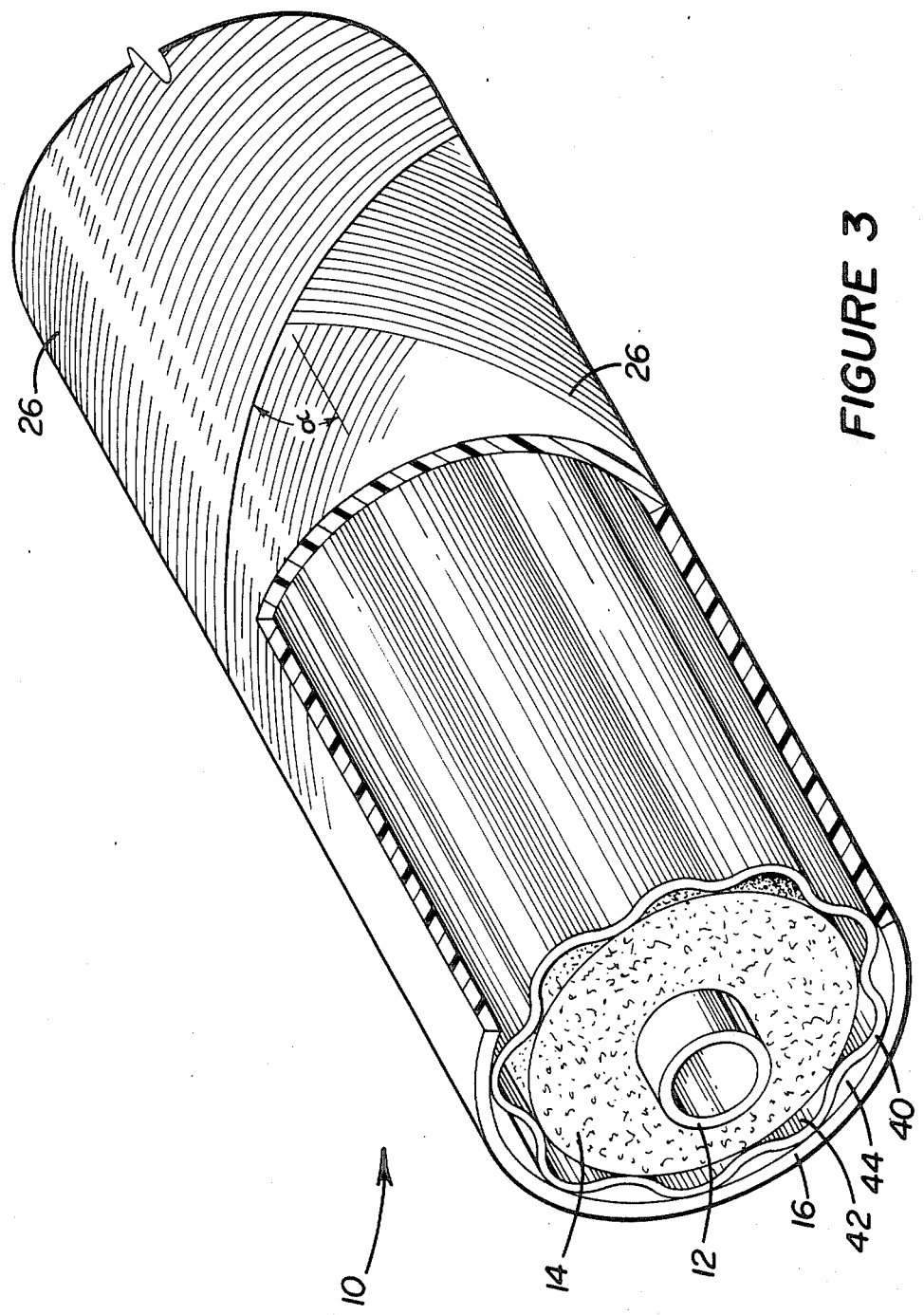
FIG. 3 is a perspective cut away view of an insulated pipe apparatus illustrating a third embodiment of the present invention.

With reference to FIG. 1, there is shown at 10 a first embodiment of an insulated pipe apparatus in accordance with this invention. The pipe apparatus 10 includes an inner conduit 12 for carrying fluids. The inner conduit 12 may be composed of fiberglass, PVC plastic, copper, steel, steel alloy, or other types of pipe material. The particular type of pipe used depends on the characteristics of the fluid to be carried in the pipe, i.e., its temperature, its corrosive effects on the pipe, the required pipe strength, etc. Insulating material 14 surrounds the inner conduit 12 and extends substantially the length of the conduit as best illustrated in FIG. 3. The insulating material preferably is in the form of a seamless sleeve to enhance the ease of manufacture and to resist the ingress of moisture which could corrode the inner conduit. A rigid outer casing 16 surrounds the insulating material 14. The casing includes fiberglass reinforcing which will be explained in greater detail hereinbelow.

The pipe apparatus 10 further includes means 18 for creating a plurality of elongated voids 20 between the casing 16 and the sleeve of the insulating material 14. Means 18 shown in FIG. 1 comprises a corrugated material 22, preferably made of fiberglass to resist moisture penetration and corrosion and to increase mechanical strength. It extends substantially the length of insulating material 14. The corrugated material 22 includes ridges 24 which define the continuous and constant cross-section elongated voids 20 which extend along the surface of the insulating material 14 for substantially its entire length. The voids thus formed enable the free flow of air for venting, drying and air testing of the pipe apparatus and the free flow of moisture for draining the voids. This preserves the insulative properties of the apparatus and decreases the likelihood of corrosion of the inner conduit.

As shown in FIG. 4, the pipe apparatus 10 also includes means for interconnecting the continuous elongated voids 20 and coupling means for connecting said voids with external equipment to facilitate venting, draining, drying and air testing of pipe apparatus 10. The interconnecting means comprises an annular void 46. The corrugated material 22 terminates a short distance from the inner face of disk 52 of end seal 50. The insulating material 14 and the rigid outer casing 16 extend beyond the corrugated material 22 and contact the inner face of the disk 52, thus defining the annular void 46. The end seal 50 preferably is in the form of a cap comprising the disk 52 and a cylindrical sleeve 54. The disk 52 is sealed to the end of the rigid outer casing 16 and covers the entire cross-section of the insulated pipe apparatus except for the inner conduit 12 which passes through central opening 56 in the disk 52. The inner conduit is sealed around its circumference to the disk 52. The inner face of the disk 52 defines one side of the annular void 46. The cylindrical sleeve 54 is continuous with the disk 52 and surrounds and is sealed to the rigid outer casing 16. Heat in the inner conduit is dissipated by conduction to the disk 52 and thence to the cylindrical sleeve 54. This protects the rigid outer casing 16 from thermal damage.

The rigid outer casing 16 is composed of fiberglass reinforced material which is a composite consisting of a matrix of resin in which fibrous reinforcements are contained. Commercially available glass fibers have a tensile strength of between 250,000 to 800,000 p.s.i. Polyester resins are used to bind the fibers in a rigid structure. The resins are the poly-condensation products of dicarboxylic acids and dihydroxy alcohols. Organic peroxides are used to catalyze the polyester resin and initiate the copolymerization reaction. The peroxides decompose to reduce the free radicals. These free radicals are attracted to points by unsaturation (reactive sites) and initiate the polymerization reactions. This increases the casing's ability to prevent moisture from entering the pipe apparatus and from coming into contact with the insulating material 14. That ability is especially useful in underground situations where, as pointed out earlier, water is almost always present. In above-ground applications, ultraviolet inhibitors are added to the resin to resist damage from the sun.

The rigid outer casing comprises several wrappings or layers of this fiber-resin matrix. The fiber reinforcing is spirally wrapped in layers as illustrated in FIG. 3. Filaments 26 are wound in such a way so as to maximize their strength to resist buckling while minimizing the weight of the outer casing. Using a Netting analysis, it has been found that the helix angle of the filaments should be approximately 55 degrees and more precisely 54.75 degrees, in order to best compensate for the difference between hoop (radial) stresses and longitudinal stresses.

Figure 5A:
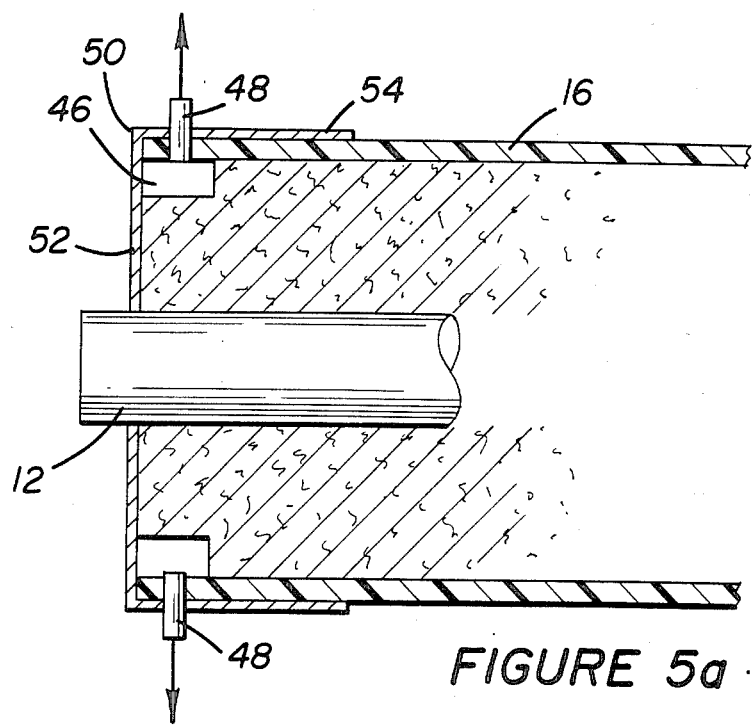
FIGS. 5a and 5b show alternative preferred configurations for venting, drying, draining and air testing ports extending from an annular void through an end seal to external equipment.
Figure 5B:
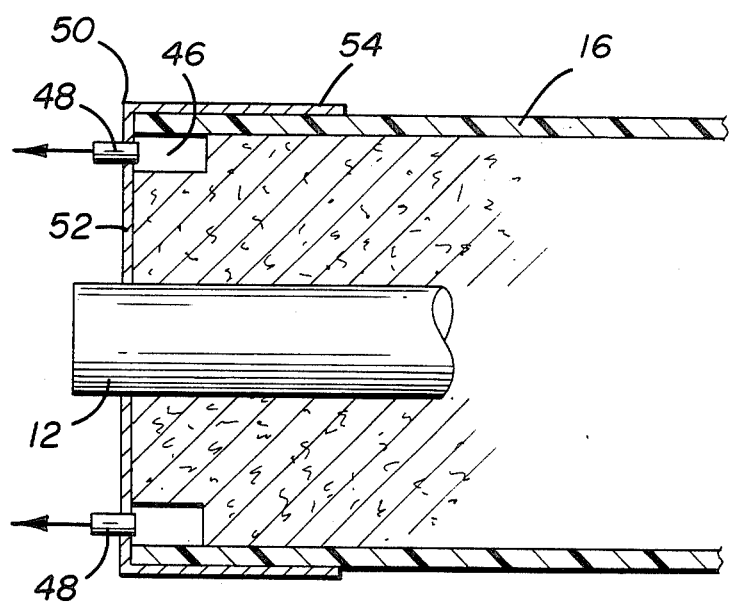

FIGS. 5a and 5b show preferred coupling means for the connecting annular void 46 with external equipment, whether the annular void is defined by cutting back the insulating material 14 or the corrugated material 22. The coupling is achieved by use of a plurality of tubular ports 48 which extend from the annular void 46 through the disk 52 or through the cylindrical sleeve 54 of the end seal 50 and terminate outside the end seal. The ports are sealed around their circumference to the disk 52 or to the cylindrical sleeve 54 and preferably terminate with a threaded or other configuration suitable for reversible connection to external equipment such as gauges, compressed gas supplies, etc.

Figure 2:
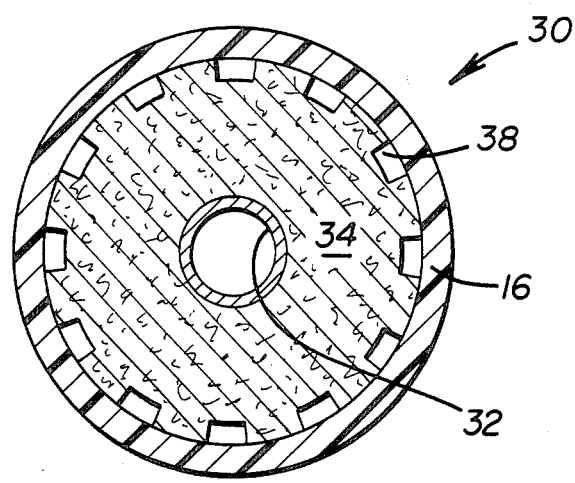
FIG. 2 is a cross-sectioned view of another embodiment of an insulated pipe apparatus in accordance with this invention.
Figure 6:
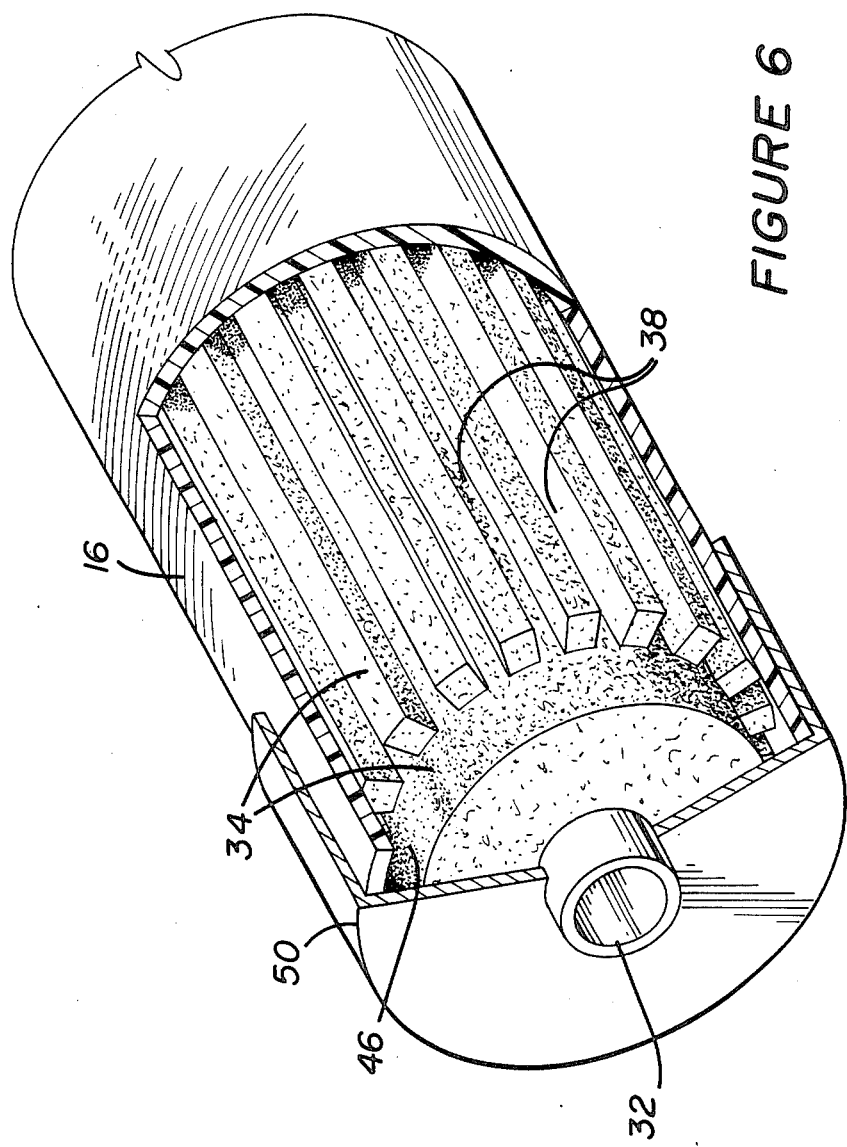
FIG. 6 shows the definition of an annular void in the embodiment of FIG. 2.

An alternative embodiment of the present invention is shown at 30 in FIG. 2. The embodiment 30 is made in much the same way as described above for the first embodiment 10 shown in FIG. 1. The second embodiment includes an inner conduit 32, surrounded by insulating material 34, preferably in the form of a seamless sleeve. The insulating material 34 is precut to form elongated voids 38 along substantially the entire length of its outer surface as illustrated. In order to partially define the annular void 46 as described in the embodiment of FIG. 1, a portion of the depth of the insulating material 34 is cut back from the end seal 50 allowing part of the insulating material 34 to remain to insulate the inner conduit 32, as shown in FIG. 6. The rigid outer casing 16 is formed coaxially around the sleeve, thereby completing definition of constant cross-section elongated voids 38. Connection of the annular void 46 to external equipment is achieved in a manner shown in FIGS. 5a and 5b.

The pipe apparatus according to the present invention preferably has a gel coat applied to the outer surface of the rigid outer casing 16. The gel coat is made from isophtalic acid polyester resins which are thickened by the addition of the thixotropic agents, such as aerosil. Pigments and ultraviolet inhibitors are also added in above-ground applications. This chemically links with the substrate and provides the insulated pipe apparatus of the present invention with added resiliency, long life exposure properties, and aesthetic appeal.

The third embodiment of the present invention is illustrated in FIG. 3. In this embodiment, corrugated sheet 40 forms elongated voids 42 and 44 and extends substantially the length of the apparatus. The voids 42 are formed between the corrugated material 40 and the insulating material 14, while similar elongated voids 44 are formed between the corrugated material 40 and the rigid outer casing 16. This increases the total cross-sectional area available for conduction of gas and fluids. The corrugated sheet terminates a short distance from the inner face of disk 52 so as to form the annular void 46 for connection to external equipment via the tubular ports 48 as shown in FIGS. 4, 5a and 5b.

The constant cross-section of the elongated voids formed by the various embodiments of the present invention are useful for at least two reasons. First, it enables freer flow of air, thereby encouraging more efficient drying of the pipe insulation. Second, the more constant the cross-section is, the less likely a random neck-down of the space will be sufficient to constrict substantially or even block off a given elongated void. This is especially important where water is being drained out of a pipe.

It is understood that although the preferred embodiments of the present invention have been illustrated and described above, alternatives and equivalents thereof will become apparent to those skilled in the art and, accordingly, the scope of the present invention should be defined only by the appended claims and equivalents thereof.

What is claimed is:

1. An insulated pipe apparatus, comprising:
an inner conduit for carrying fluids;
insulating material surrounding said inner conduit and extending substantially the length of said inner conduit, said insulating material being a circumferentially and longitudinally continuous sleeve along the length of said inner conduit;
a rigid outer casing of a material resistant to mechanical stress and moisture ingress, coaxial and coextensive with said inner conduit and surrounding said insulating material;
means defining a plurality of longitudinal elongated voids between said outer casing and said insulating material, said elongated voids being of substantially constant cross-section and coextensive with said insulating material;
including interconnecting means for interconnecting said elongated voids and for sealing the ends of said insulated pipe apparatus between the outer surface of said inner conduit and said rigid outer casing, and coupling means for connecting said elongated voids to external equipment.

2. An insulated pipe apparatus as set forth in claim 1 wherein said means defining a plurality of elongated voids comprises a rigid circumferentially continuous sheet of corrugated material inserted between said rigid outer casing and said insulating material.

3. An insulated pipe apparatus as set forth in claim 2 wherein said corrugated material is made of fiberglass for structural rigidity and for resistance to moisture ingress and corrosion.

4. An insulated pipe apparatus as set forth in claim 1 wherein said means defining a plurality of elongated voids comprises a plurality of slots in the outer surface of said insulating material, said slots being substantially coextensive with said insulating material.

5. An insulated pipe apparatus as set forth in claim 2 wherein said interconnecting means comprises an annular void defined by termination of said corrugated material a short distance from the ends of said rigid outer casing and said insulating material, means for sealing the ends of said insulated pipe apparatus between the outer surface of said inner conduit and said rigid outer casing, and coupling means for connecting said annular void to external equipment.

6. An insulated pipe apparatus as set forth in claim 1 wherein said coupling means comprises a plurality of tubular ports extending through said interconnecting means.

7. An insulated pipe apparatus comprising:
an inner conduit for carrying fluids;
insulating material surrounding said inner conduit and extending substantially the length of said inner conduit;
a rigid outer casing of a material resistant to mechanical stress and moisture ingress, coaxial and coextensive with said inner conduit and surrounding said insulating material;
means defining a plurality of longitudinal elongated voids between said outer casing and said insulating material comprising a plurality of slots in the outer surface of said insulating material, said elongated voids being of substantially constant cross-section and coextensive with said insulating material;
interconnecting means for interconnecting said elongated voids at each end of said insulated pipe apparatus comprising an annular void defined by the termination of at least a portion of said insulating material radially distal to said inner conduit proximate to the end of said rigid outer casing and the portion of said insulating material proximate to said inner conduit;

means for sealing the ends of said insulated pipe apparatus between the outer surface of said inner conduit and said rigid outer casing; and coupling means for connecting said annular void to external equipment.

8. An insulated pipe apparatus as set forth in claim 5 wherein said interconnecting means comprises a cap having a disk portion and a cylindrical sleeve portion extending from the periphery of said disk portion, said disk portion being pierced by and sealed to the outer surface of said inner conduit, said cylindrical sleeve portion surrounding and being sealed to the outer surface of said rigid outer casing, said means defining one side of said disk of said interconnecting annular void.

* * * * *